(12) United States Patent
Liu

(10) Patent No.: US 6,351,257 B1
(45) Date of Patent: Feb. 26, 2002

(54) POINTING DEVICE WHICH USES AN IMAGE PICTURE TO GENERATE POINTING SIGNALS

(75) Inventor: Wen-Hsiung Liu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/373,757

(22) Filed: Aug. 13, 1999

(30) Foreign Application Priority Data

Aug. 8, 1999 (TW) ........................................ 88111565 A

(51) Int. Cl.$^7$ ................................................. G09G 5/08
(52) U.S. Cl. ........................................ 345/163; 345/166
(58) Field of Search ................................ 345/156–179; 250/231.13, 232

(56) References Cited

U.S. PATENT DOCUMENTS

| | | | |
|---|---|---|---|
| 5,526,481 A | * 6/1996 | Parks et al. | 345/341 |
| 5,991,431 A | * 11/1999 | Borza et al. | 382/127 |
| 5,994,710 A | * 11/1999 | Knee et al. | 250/557 |
| 6,198,473 B1 | * 3/2001 | Armstrong | 345/163 |

* cited by examiner

Primary Examiner—Almis R. Jankus
Assistant Examiner—Amr Awad
(74) Attorney, Agent, or Firm—Winston Hsu

(57) ABSTRACT

The invention relates to a pointing device which uses an image picture to generate pointing signals. The pointing device comprises a housing, a line-shaped contact image sensor installed on an upper side of the housing for inputting a line-shaped image and generating a corresponding line image signal, and an image processing circuit installed in the housing and connected to the image sensor for receiving and processing the line image signal generated by the image sensor. A user can move an image picture across the image sensor in a direction perpendicular to the line direction of the image sensor to sequentially generate a series of line image signals, and the image processing circuit saves the series of line image signals in a bit map format which contains the image of the image picture in it. When the user moves the image picture across the image sensor to generate a first line image signal and a second line image signal, the image processing circuit will convert the first and second line image signals into first and second coordinates according to the positions of the first and second line image signals within the bit map, and generate a pointing signal according to the difference between the first and second coordinates.

6 Claims, 5 Drawing Sheets

```
0 0 0 0 0 1 0 0 0 0
0 0 0 1 0 0 1 0 0 0  ◄── 84
0 0 1 1 0 1 0 1 0 0  ◄── 86
0 1 0 1 0 0 0 1 1 0
0 0 1 0 1 1 1 1 0 0
0 0 0 0 0 1 1 0 0 0
0 0 0 0 0 0 0 0 0 0
```

POINTING DEVICE WHICH USES AN IMAGE PICTURE TO GENERATE POINTING SIGNALS

BACKGROUND OF THE INVENTION

1. Field of the Invention

The invention relates to a pointing device, and more particularly, to a pointing device which uses an image picture to generate pointing signals.

2. Description of the Prior Art

A pointing device such as a mouse is used for generating pointing signals to control movements of a cursor on a display device. A prior art mouse commonly comprises two or three buttons installed on its housing for inputting button signals. The scrolling of a window on the display device can be performed by moving a scroll square on the scroll bar to another position. This is done by moving the cursor to a scroll bar of the window first and then depressing one of the buttons on the mouse.

Please refer to FIG. 1 and FIG. 2. FIG. 1 is a perspective view of a prior art mouse 10. FIG. 2 is a functional block diagram of the mouse 10. The mouse 10 is electrically connected to a computer system 20, and the computer system 20 is electrically connected to a display device 22. The mouse 10 comprises a housing 12, two buttons 14 positioned on an upper side of the housing 12 for inputting button signals, and a roller ball (not shown) installed on a bottom side of the housing 12 for controlling movements of a cursor on the display device 22.

The computer system 20 comprises a memory 24 for storing programs and data, a processor 26 for executing the programs stored in the memory 24, a button control program 28 stored in the memory 24 for receiving and processing the button signals generated by the buttons 14, and a display control program 30 such as Microsoft Word stored in the memory 24 for controlling the scrolling of a window 32 displayed on the display device 22 according to the button signals.

Because scrolling the window 32 requires a user to move the cursor to a scroll bar of the window 32 first, and then input button signals from one of the buttons 14. It is extremely inconvenient for the user.

SUMMARY OF THE INVENTION

It is therefore a primary objective of the present invention to provide a pointing device to solve the above mentioned problem.

Briefly, in a preferred embodiment, the present invention provides a pointing device comprising:

a housing;

a line-shaped contact image sensor installed on an upper side of the housing for inputting a line-shaped image and generating a corresponding line image signal, each line image signal comprising a predetermined number of data bits; and an image processing circuit installed in the housing and connected to the image sensor for receiving and processing the line image signal generated by the image sensor;

wherein a user can move an image picture across the image sensor in a direction perpendicular to the line direction of the image sensor to sequentially generate a series of line image signals, and the image processing circuit saves the series of line image signals in a bit map format which contains the image of the image picture in it, and then the user can move the image picture across the image sensor to generate a first line image signal and a second line image signal, and the image processing circuit will convert the first and second line image signals into first and second coordinates according to the positions of the first and second line image signals within the bit map, and generate a pointing signal according to the difference between the first and second coordinates.

It is an advantage of the present invention that the pointing device comprises a line-shaped contact image sensor for inputting an image picture so that scrolling a window becomes an easy task.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
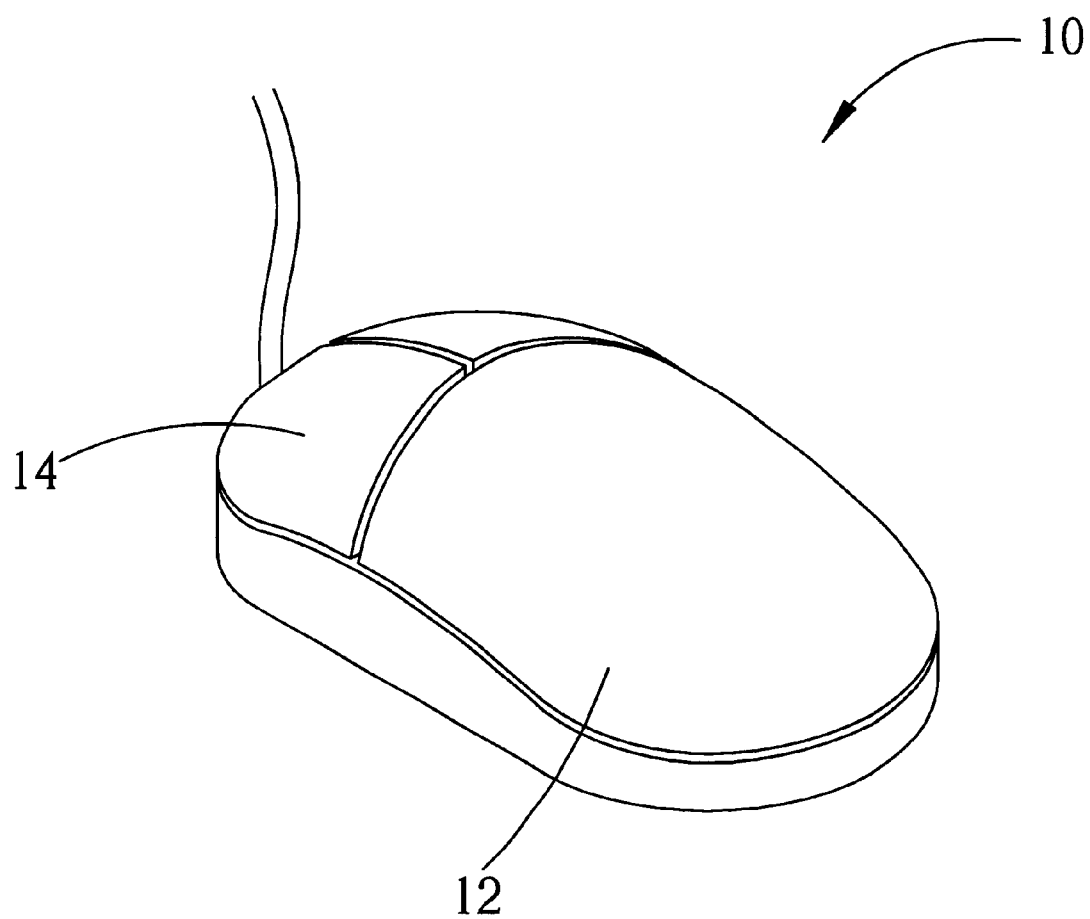
FIG. 1 is a perspective view of a prior art mouse.
Figure 2:
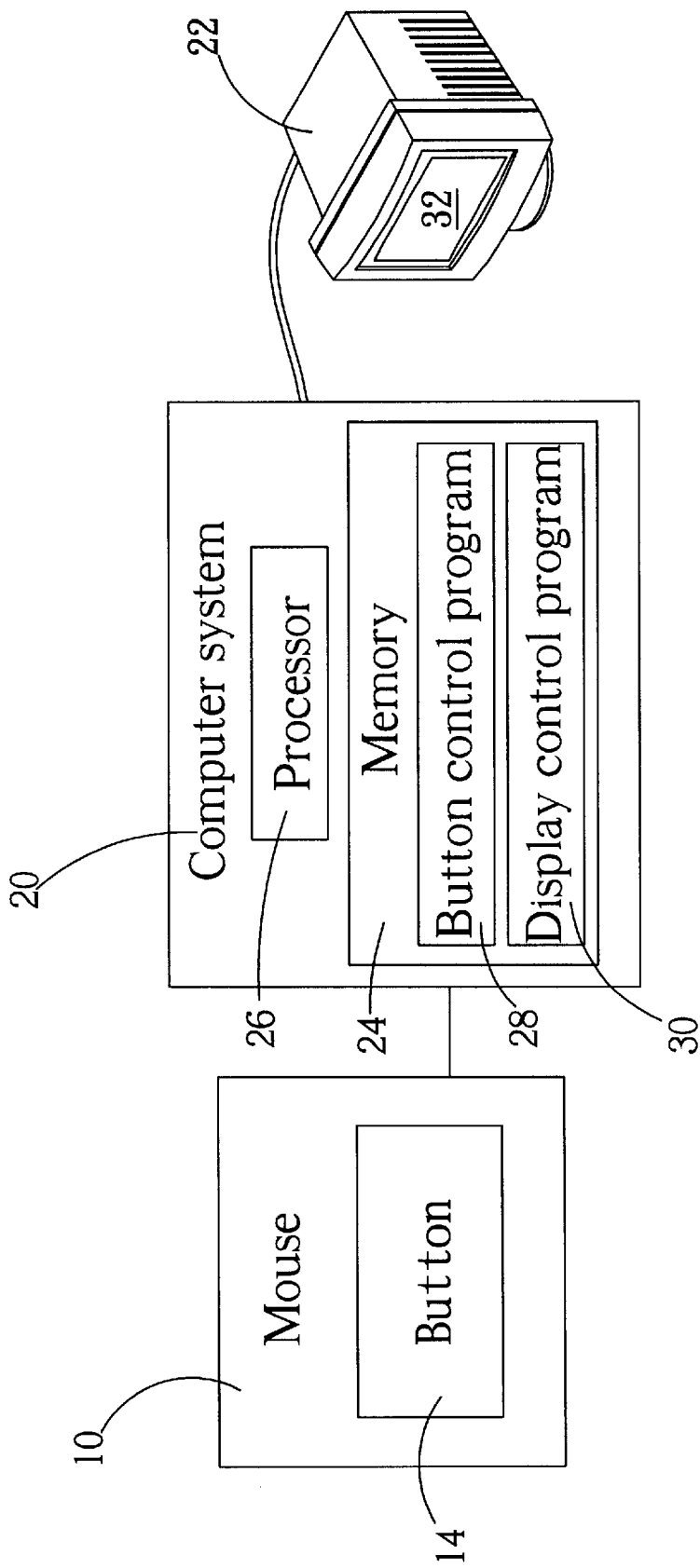
FIG. 2 is a functional block diagram of the mouse in FIG. 1.
Figure 3:
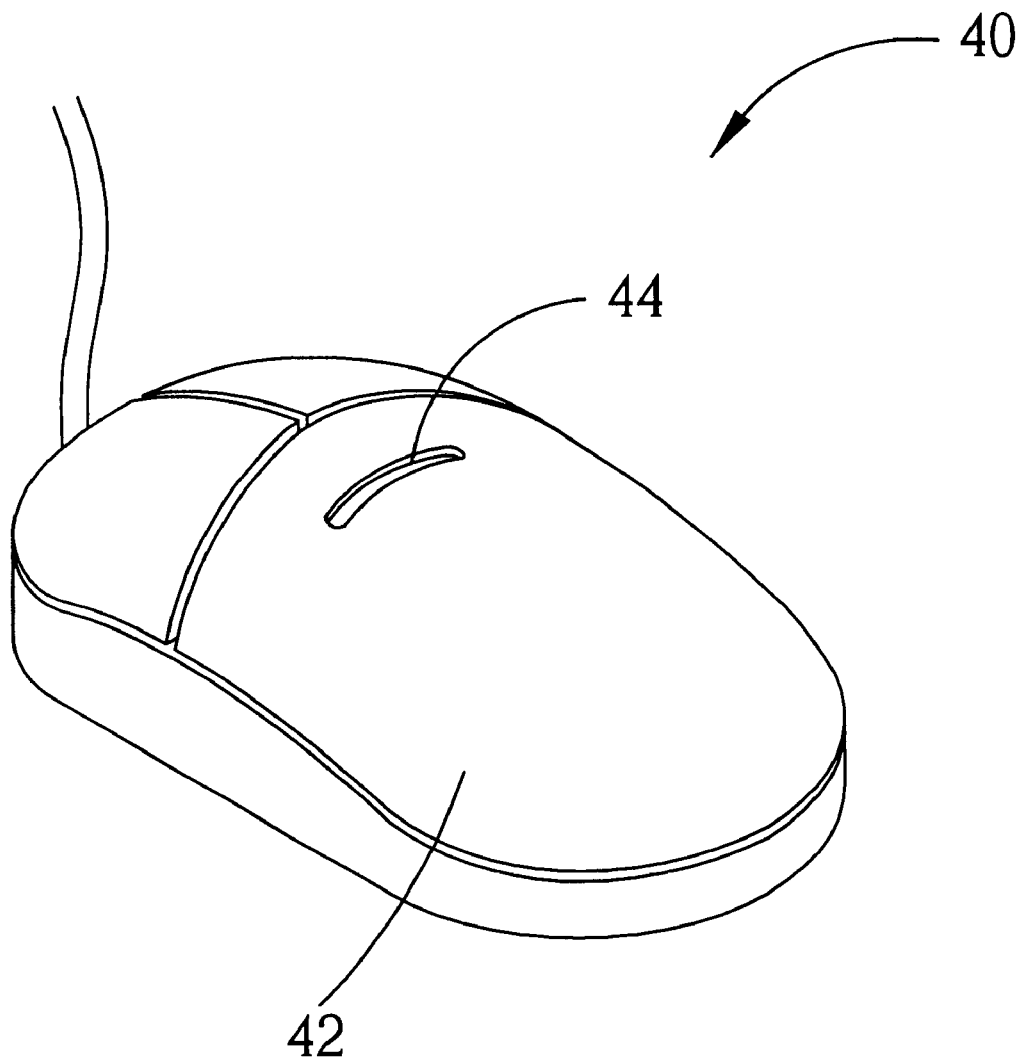
FIG. 3 is a perspective view of a mouse according to the present invention.
Figure 4:
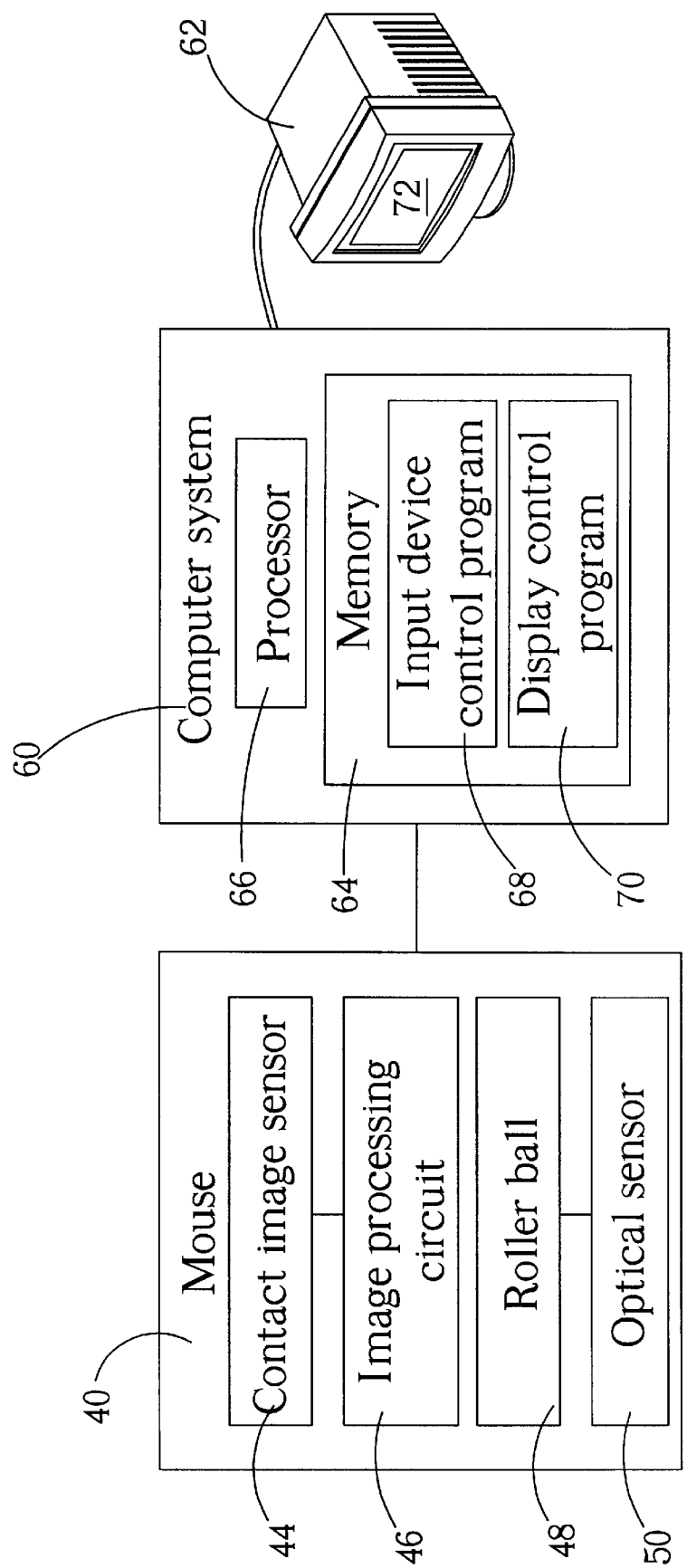
FIG. 4 is a functional block diagram of the mouse in FIG. 3.

Please refer to FIG. 3 and FIG. 4. FIG. 3 is a perspective view of a mouse 40 according to the present invention. FIG. 4 is a functional block diagram of the mouse 40. The mouse 40 comprises a housing 42, a line-shaped contact image sensor 44 installed on an upper side of the housing 42 for inputting a line-shaped image and generating a corresponding line image signal, an image processing circuit 46 installed in the housing 42 and connected to the image sensor 44 for receiving and processing the line image signal generated by the image sensor 44, a roller ball 48 installed on a bottom side of the housing 42, and two optical sensors 50 installed in the housing 42 for detecting the rotations of the roller ball 48 in two directions perpendicular to each other and generating corresponding two-dimensional pointing signals. Each line image signal generated by the image sensor 44 comprises a predetermined number of data bits.

The mouse 40 is connected to a computer system 60, and the computer system 60 is connected to a display device 62. The computer system 60 comprises a memory 64 for storing programs and data, a processor 66 for executing the programs stored in the memory 64, an input device control program 68 such as a mouse driver stored in the memory 64 for receiving and processing the pointing signals generated by the image processing circuit 46, and a display control program 70 such as Microsoft Word stored in the memory 64 for controlling the scrolling of a window 72 displayed on the display device 62 according to the pointing signals. The image processing circuit 46 in the mouse 40 can also be installed in the computer system 60 for receiving and processing the line image signal generated by the image sensor 44.

Figures 5, 6:
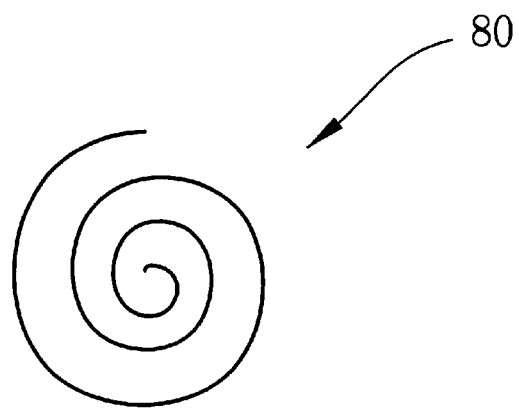
FIG. 5 is a predetermined image picture.
FIG. 6 is a series of line image signals in a bit map format corresponding to the image picture in FIG. 5.

Please refer to FIG. 5 and FIG. 6. FIG. 5 is a predetermined image picture 80. FIG. 6 is a series of line image signals 82 in a bit map format corresponding to the image picture 80. A user can move a predetermined image picture 80 across the image sensor 44 in a direction perpendicular to the line direction of the image sensor 44 to sequentially generate a series of line image signals 82. Then, the image processing circuit 46 can save the series of line image signals 82 in a bit map format. The series of line image signals 82 will thus form the image of the image picture 80.

When the user moves the image picture 80 across the image sensor 44 and the image sensor 44 generates a first line image signal 84 (0001001000) followed by a second line image signal 86 (0011010100), the image processing circuit 46 will convert the first and second line image signals 84, 86 into first and second coordinates according to their positions within the bit map 82, and generate a pointing signal according to the difference between the first and second coordinates. Because the difference between the first and second line image signals 84, 86 is one unit along a vertical direction, the image processing circuit 46 will generate a one-unit downward pointing signal.

When the user moves the image picture 80 across the image sensor 44 and the image sensor 44 generates a first line image signal 84 (0001001000) followed by a second line image signal 0000010010, which is two units to the right of the first line image signal 84, the image processing circuit 46 will generate a two-unit pointing signal pointing toward the right direction.

When the user moves the image picture 80 across the image sensor 44 and the image sensor 44 generates a first line image signal 84 (0001001000) followed by a second line image signal 0000110101, which is two units to the right of the line image signal 86, the image processing circuit 46 will generate a pointing signal with a step of two units to the right and one unit downward.

Because the image processing circuit 46 generates pointing signals according to the movement direction and speed of the image picture 80, the user can scroll the window 72 on the display device 62 simply by moving his finger above the image sensor 44.

Compared with the prior art mouse 10, the mouse 40 comprises a line-shaped contact image sensor 44 installed on the housing 42 for inputting an image picture. Thus a user can scroll the window 72 conveniently.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing device comprising:

a housing;

a line-shaped contact image sensor installed on an upper side of the housing for sensing a line-shaped image and generating a corresponding line image signal, each line image signal comprising a predetermined number of data bits; and an image processing circuit installed in the housing and connected to the image sensor for receiving and processing the line image signal generated by the image sensor;

wherein a user can move an image picture across the image sensor in a direction perpendicular to the line direction of the image sensor to sequentially generate a series of line image signals, and the image processing circuit saves the series of line image signals in a bit map format which contains the image of the image picture in it, and then the user can move the image picture across the image sensor to generate a first line image signal and a second line image signal, and the image processing circuit will convert the first and second line image signals into first and second coordinates according to the positions of the first and second line image signals within the bit map, and generate a pointing signal according to the difference between the first and second coordinates.

2. The pointing device of claim 1 being a mouse which further comprises a roller ball installed on a bottom side of the housing and two optical sensors installed in the housing for detecting the rotations of the roller ball in two directions perpendicular to each other and generating corresponding two dimensional pointing signals.

3. The pointing device of claim 1 being connected to a computer system, the computer system comprising:

a display device for displaying a window;

a memory for storing programs and data;

a processor for executing the programs stored in the memory;

an input device control program stored in the memory for receiving and processing the pointing signals generated by the image processing circuit; and a display control program stored in the memory for controlling the scrolling of the window displayed on the display device according to the pointing signals.

4. A pointing device connected to a computer system, the pointing device comprising:

a housing; and a line-shaped contact image sensor installed on an upper side of the housing for sensing a line image and generated a corresponding line image signal, each line image signal comprising a predetermined number of bits;

the computer system comprising:

an image processing circuit connected to the image sensor for receiving and processing the line image signals generated by the image sensor;

wherein a user can move an image picture across the image sensor in a direction perpendicular to the line direction of the image sensor to sequentially generate a series of line image signals, and the image processing circuit saves the line image signals in a bit map format which contains the image of the image picture in it, and then the user can move the image picture across the image sensor to generate a first line image signal and a second line image signal, and the image processing circuit will convert the first and second line image signals into a first and second coordinates according to the positions of the first and second line image signals within the bit map, and generate a pointing signal according to the difference between the first and second coordinates.

5. The pointing device of claim 4 being a mouse which further comprises a roller ball installed on a bottom side of the housing and two optical sensors installed in the housing for detecting the rotations of the roller ball in two directions perpendicular to each other and generating corresponding two dimensional pointing signals.

6. The pointing device of claim 4 wherein the computer system further comprising:

a display device for displaying a window;

a memory for storing programs and data;

a processor for executing the programs stored in the memory;

an input device control program stored in the memory for receiving and processing the pointing signals generated by the image processing circuit; and a display control program stored in the memory for controlling the scrolling of the window displayed on the display device according to the pointing signals.

* * * * *